United States Patent [19]
Fukatsu et al.

[11] Patent Number: 5,206,683
[45] Date of Patent: Apr. 27, 1993

[54] COMPACT OPTICAL PRINTER WITH PLANAR PHOTORECEPTOR

[75] Inventors: Takeo Fukatsu, Kyoto; Hironobu Tsujimoto; Toshihiko Hiratani, both of Osaka; Kazuyuki Gotoh, Kumamoto; Yasuo Kishi, Osaka, all of Japan

[73] Assignee: Sanyo Electric Co., Ltd., Osak, Japan

[21] Appl. No.: 521,688

[22] Filed: May 9, 1990

[30] Foreign Application Priority Data

May 21, 1989 [JP] Japan ................................ 1-119106

[51] Int. Cl.⁵ ..................... G03G 15/00; G03G 21/00
[52] U.S. Cl. ..................................... 355/202; 355/211; 355/212
[58] Field of Search ............... 355/202, 211, 212; 358/296, 300

[56] References Cited

U.S. PATENT DOCUMENTS

| | | | |
|---|---|---|---|
| 3,234,020 | 2/1966 | Stockdale | 355/211 X |
| 4,264,182 | 4/1981 | Mitchell | 355/212 X |
| 4,545,669 | 10/1985 | Hays et al. | 355/212 X |
| 4,607,934 | 8/1986 | Kohyama et al. | 355/211 X |
| 4,723,138 | 2/1988 | Hashimoto et al. | 358/300 X |
| 4,760,410 | 7/1988 | Kishi | 358/300 |

Primary Examiner—Fred L. Braun
Attorney, Agent, or Firm—Darby & Darby

[57] ABSTRACT

An optical printer includes a housing in which a photoreceptor including a transparent substrate, a transparent electrode layer and a photosensitive layer composed of a-Si which are formed on the substrate is housed. A main surface of photoreceptor is moved in a first direction parallel therewith. The charging of the photoreceptor, the forming of an electrostatic latent image and the toner-developing are performed at approximately the same time and a toner image formed on the photoreceptor is transcribed onto a paper by a transcribing roller. The paper which is inserted from a first opening formed on the housing is fed in the first direction with respect to the transcribing roller through a first feeding path. A contact line sensor is arranged above the photoreceptor at a position in the vicinity of the transcribing roller. An original which is inserted from a second opening formed on the housing is fed to the line sensor in a second direction opposite to the first direction through a second feeding path. The first and second feeding paths include a common feeding path. In addition, a transcribed toner image is fixed on the paper by a fixing device.

17 Claims, 3 Drawing Sheets

F I G. 1
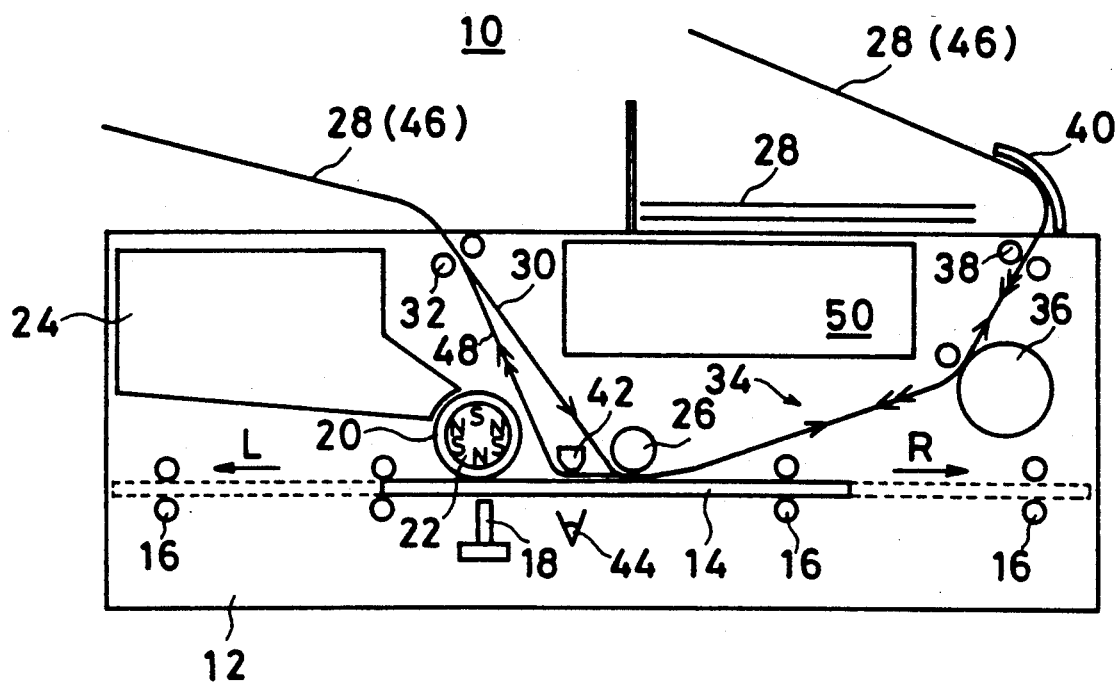
F I G. 2
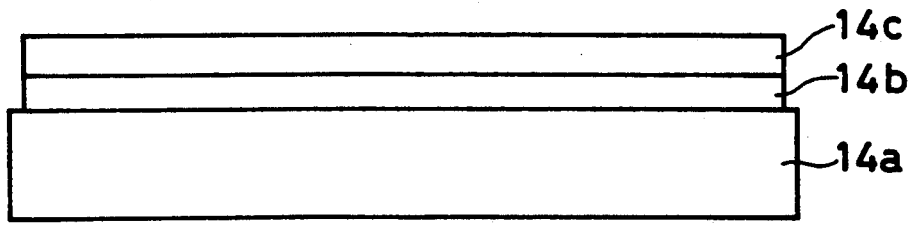

F I G.5
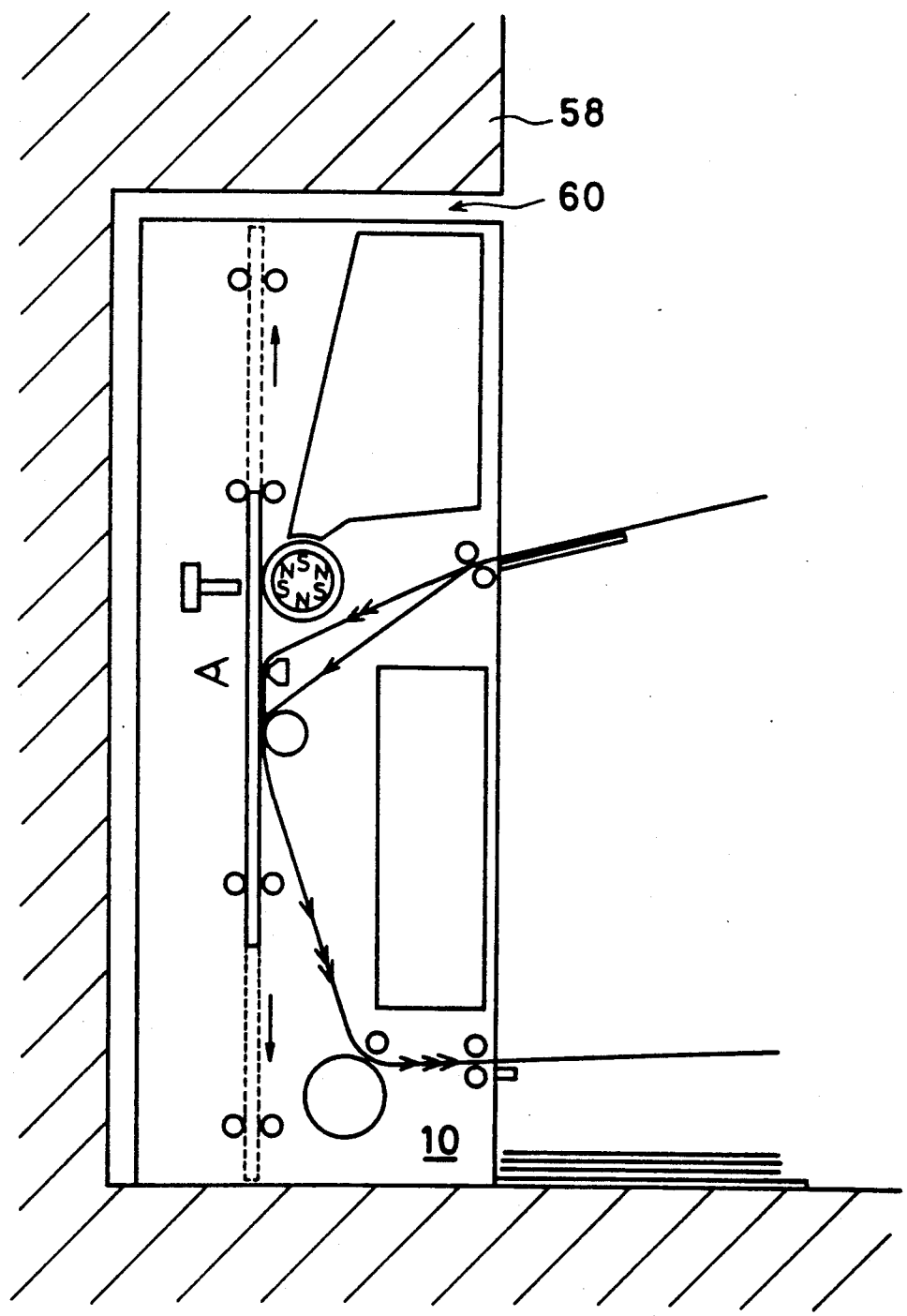

COMPACT OPTICAL PRINTER WITH PLANAR PHOTORECEPTOR

BACKGROUND OF THE INVENTION

1. Field of the Invention

The present invention relates to an optical printer. More specifically, the present invention relates to an optical printer which includes an image output device utilizing an electrophotographing system and an image input device utilizing a line sensor.

2. Description of the Prior Art

Recently, a facsimile having a copying function receives much attention. Such a facsimile is provided with an image output device and an image input device. In the image output device, an electrophotographing system is utilized. In addition, in the image input device, recently, a contact line sensor having a short light path is utilized.

However, in a conventional facsimile, the image output device and the image input device are separately provided by accommodating the same in separate housings. Therefore, it was difficult to make a facsimile compact as a whole.

SUMMARY OF THE INVENTION

Therefore, a principal object of the present invention is to provide a novel optical printer.

Another object of the present invention is to provide an optical printer which is provided with an image output device and an image input device and capable of being miniaturized.

The other object of the present invention is to provide an optical printer, in which a very thin member is used as a photosensitive member of an electrophotographing system, thereby to miniaturize the same.

An optical printer in accordance with the present invention comprises: a photoreceptor including a transparent substrate, a transparent electrode layer formed on the substrate and a photosensitive layer, said photoreceptor forming a planar surface which is moved in a direction parallel therewith; toner supplying means including an opposite electrode arranged in opposition to the photoreceptor; electric field applying means for applying an electric field between the transparent electrode layer of the photoreceptor and the opposite electrode; exposing means for exposing a light image from a side of the substrate; toner absorption means for applying a force to a toner to be absorbed toward the opposite electrode; transcribing means for forming a toner image by selectively adhering the toner on the photoreceptor and for transcribing the toner image onto a paper; and fixing means for fixing the toner image as transferred.

In an image output device, a toner image is formed on the photoreceptor by utilizing an electrically conductive toner and the toner image is transcribed onto the paper and then fixed. In addition, in a case where an image input device, i.e. image reading means, is provided, the image reading means reads the toner image on the photoreceptor or an image on an original being inserted from the outside. A read image data is stored in a memory as necessary, and applied to another equipment or outputted on the paper in accordance with the above described method.

In accordance with the present invention, it is possible to obtain an optical printer which is capable of being drastically miniaturized. In addition, in a case where the optical printer is used as a highly functional facsimile, it is possible to record the information as an electric signal upon the receipt of the image information or immediately thereafter, and therefore, in comparison with a system in which all the image information is temporarily stored in a page memory and thereafter recorded as done in the past, it is possible to omit the time required for storing and thus it becomes possible to rapidly output the image.

In addition, by utilizing a thin film a-Si photoreceptor as a plate-like photoreceptor or belt-like photoreceptor, it is possible to obtain a photoreceptor having a planar surface of a large area with a low cost and, due to the high-performance and long-life thereof, it is possible to drastically reduce the running cost and increase the reliability.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 1 is an illustrative view showing one embodiment in accordance with the present invention.

FIG. 2 is an illustrative view showing one example of a photoreceptor which is capable of being utilized in FIG. 1 embodiment.

FIG. 5 is an illustrative view showing an application example of FIG. 1 embodiment.

DETAIL DESCRIPTION OF THE PREFERRED EMBODIMENTS

Figure 3:
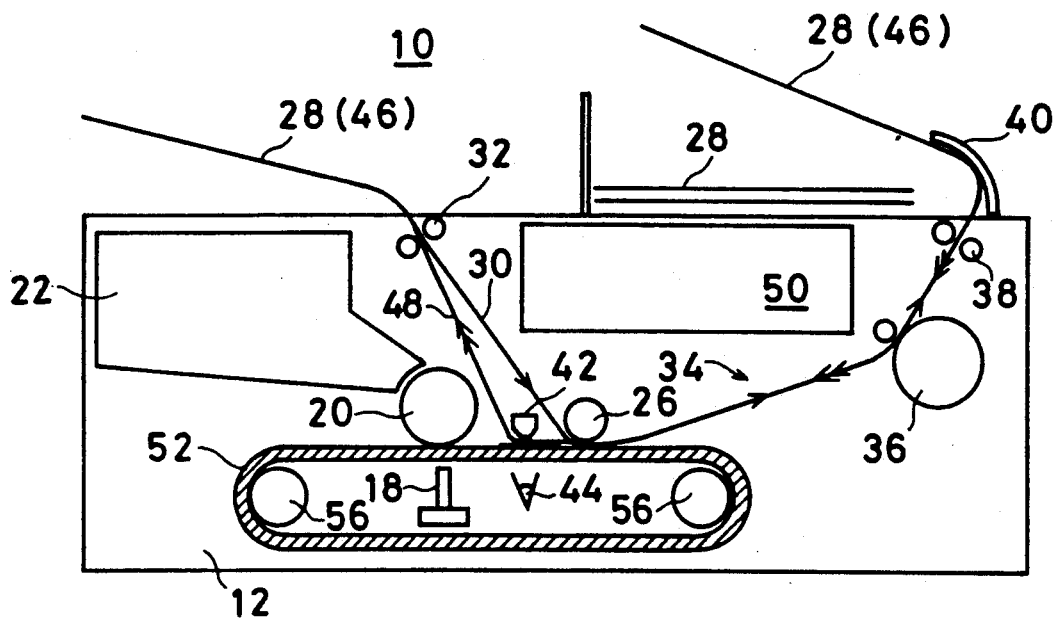
FIG. 3 is an illustrative view showing another embodiment in accordance with the present invention.

With reference to FIG. 1, an optical printer 10 of this embodiment shown includes a housing 12 in which a plate-like photoreceptor 14 is supported by rollers 16, 16, . . . to be capable of being horizontally moved in a rightward direction shown by an arrow mark R and in a leftward direction shown by an arrow mark L. Although not shown, the rollers 16 are connected to a driving source, i.e. a motor by a belt, gear or the like, for example.

The plate-like photoreceptor 14 is specifically has the structure shown in FIG. 2. More specifically, the plate-like photoreceptor 14 includes a transparent substrate 14a composed, for example, a glass plate or an organic transparent plate of a polyimide family and having a heat resistance. On the substrate 14a, a transparent or semitransparent electrode layer 14b composed of, for example, ITO (Indium/Tin/Oxide), $SnO_2$, TCO (Transparent Conductive Oxide) such as a metallic thin layer is formed. A photosensitive layer 14c is formed on the transparent or semitransparent electrode layer 14b, and the photosensitive layer 14c is composed of, for example, a-Si (Amorphous Silicon) hydride or halide. In addition, a film thickness of the photosensitive layer 14c exists in a range of $1 \times 10^{-2}$ μm 100 μm preferably, and the most preferably, in a range of $1 \times 10^{-1}$ μm — 10 μm.

Below a movement path of the plate-like photoreceptor 14, a first light source 18 mainly composed of, for example, an LED array or a laser beam and a scanning system therefor is arranged and a light from the same is irradiated onto the above described plate-like photoreceptor 14. At a position opposite to the first light source 18, as the plate-like photoreceptor 14 is sandwiched therebetween, an opposite electrode 20 composed of a hollow metallic cylinder, which is normally called a sleeve, is arranged. Although not shown, a voltage for charging the photosensitive layer 14c (FIG. 2) of the plate-like photoreceptor 14 though an electric conductive toner (described later) is applied to the opposite electrode 20. In addition, this voltage is also utilized as a so-called developing bias. A magnetic roller 22 is housed within a hollow portion of the opposite electrode 20, and the magnetic roller 22 is provided with rectangular-post magnets of N poles and S poles being alternately arranged. The rectangular-post magnets are brought into contact with the inside of the magnetic roller 22. By a magnetic force of the magnetic roller 22, the electric conductive toner being supplied from a toner box 24 can be held around the opposite electrode 20.

At a downstream side of the opposite electrode 20 in a feeding direction of the plate-like photoreceptor 14, a transcriber 26 is arranged above the plate-like photoreceptor 14, and the transcriber 26 transfers or transcribes a toner image formed on the plate-like photoreceptor 14 onto a paper 28 sent through a feeding path 30. More specifically, the paper 28 is fed to a position of the transcriber 26 by means of a roller 32 which is provided at an inlet of the path. The transcriber 26 includes cylindrical metallic roller to which a voltage having a polarity opposite to that of a voltage applied to the above described toner is applied. Then, the paper 28 on which the toner image has been transcribed is fed through a common path 34 to fixing device 36 which includes a heating roller incorporating a heater. A further roller 38 is arranged in a vicinity of the outlet of the common path 34 and the paper 28 passing through the fixing device 36 is discharged by this roller 38. In addition, a paper guide 40 is attached to the outlet, whereby discharged paper 28 is aligned.

In an operation, the electric conductive toner being supplied from the toner box 24 has an electric conductivity at the degree of $10^{-3}$ S·cm$^{-1}$ as well as a magnetic property and, by the magnetic force of the magnetic roller 22, the toner comes into contact with the outer surface of the opposite electrode 20 which is being rotated. Therefore, the electric conductive toner is brought into contact with the plate-like photoreceptor 14 to rub against the same in accordance with the rotation of the opposite electrode 20.

At this time, as described above, a voltage is applied to the opposite electrode 20 and this voltage uniformly charges the plate-like photoreceptor 14 which is moved toward the transcriber 26 at a constant speed through the electric conductive toner. On the other hand, the electric conductive toner is brought into contact with the plate-like photoreceptor 14 at portions where a light image equal to the inputted image information is irradiated from the first light source 18 which is positioned at rear side, that is, at a side of the transparent substrate 14a. Since the toner charge potential is reduced by the photo-carrier charge which is generated by irradiating the light, an electric attraction force (Coulomb force) stronger than the magnetic force which holds the electric conductive toner in contact with the plate-like photoreceptor 14 toward the opposite electrode 20 is generated on the plate-like photoreceptor 14, and therefore, a toner image corresponding to the light image is formed on the plate-like photoreceptor 14.

The toner image on the plate-like photoreceptor 14 is transferred to the paper by the transcriber 26 and fixed by the fixing device 36.

In addition, in this embodiment shown, in order to miniaturize the apparatus, the plate-like photoreceptor 14 is used as a photoreceptor; however, a belt-like photoreceptor (FIG. 3) may be utilized as described later.

Next, an image input device included in the optical printer 10 of FIG. 1 embodiment will be described. Between the opposite electrode 20 and the transcriber 26, a contact photo-array sensor (contact line sensor) 42 which is composed of a-Si, and does not use an optical system such as a lens, is arranged above the moving path of the plate-like photoreceptor 14. At a position opposite to the contact line sensor 42, as the plate-like photoreceptor 14 is sandwiched therebetween, a second light source 44 which may be an LED array, tungsten or halogen lamp being aligned in a line, or the like is arranged. The second light source 44 is utilized for reading the toner image on the plate-like photoreceptor 14 or an image on an original (not shown) which is fed through the common path 34. When the original is fed in the common path 34 to be read, the roller 38 functions as an inlet roller and the roller 32 functions as an outlet roller. Therefore, in this case, the original from the common path 34 is fed to a feeding path through the contact line sensor 42 below the same and discharged by the roller 32.

In addition, the image data read by the contact line sensor 42 is stored in a memory (not shown) which is provided in a control circuit 50. Therefore, if the optical printer 10 of this embodiment shown is an apparatus having a facsimile function, the image data stored in the memory may be transmitted to a facsimile receiving apparatus at the location of the other party. In addition, by utilizing the image data stored in the memory, it is possible to obtain a large number of copies. When the image data is to be copied, the image data may be inputted to the aforementioned first light source 18.

In addition, in accordance with this embodiment shown, it is possible to directly read the toner image formed on the plate like photoreceptor 14 by the contact line sensor 42 and store the image data in the memory, and therefore, if the optical printer 10 is a facsimile, it is possible to record the received image being received on the paper 28 and stored in the memory. Therefore, by inputting the image data from the memory to the first light source 18 to form an electrostatic latent image on the plate-like photoreceptor 14 in accordance with the above described method, without no further copying machine, it becomes possible to copy the received image.

FIG. 3 is an illustrative view showing another embodiment in accordance with the present invention. This embodiment is the same or similar to FIG. 1 embodiment except for the following points. More specifically, in FIG. 3 embodiment, instead of the plate-like photoreceptor 14 of FIG. 1 embodiment, a belt-like photoreceptor 52 is utilized. As shown in FIG. 4D, the belt-like photoreceptor 52 includes a sheet-like substrate 52a having transparency and flexibility, and on the sheet-like substrate 52a, sequentially, a transparent electrode 52b and an a-Si photosensitive layer 52c are formed. A film thickness of the a-Si photosensitive layer 52c is less than 1 μm and a thickness of the photoreceptor 52 is approximately 0.2 mm as a whole.

Figure 4A:
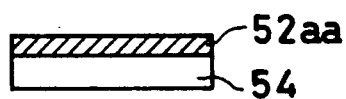
FIGS. 4A-4D are illustrative views showing a method for manufacturing a photoreceptor which is capable of being utilized in FIG. 3 embodiment.
Figure 4B:
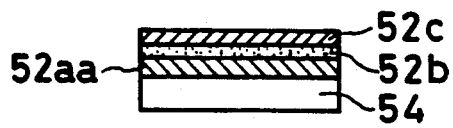
Figure 4C:
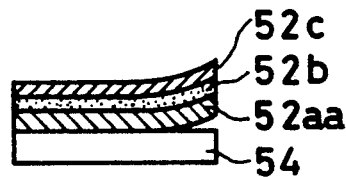
Figure 4D:
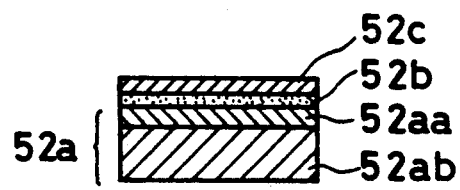

The belt-like photoreceptor 52 can be manufactured through the steps shown in FIGS. 4A-4D. At first, as shown in FIG. 4A, a transparent polyimide film 52aa is coated on a plain glass substrate 54. Next, as shown in FIG. 4B, the transparent electrode 52b and the a-Si photosensitive layer 52c are sequentially laminated on the polyimide film 52aa. Thereafter, as shown in FIG. 4C, the polyimide film 52aa is separated from the glass substrate 54 and, lastly, as shown in FIG. 4D, a transparent polyethylene sheet 52ab is adhered to the polyimide film 52aa. Therefore, the polyimide film 52aa and the polyethylene sheet 52ab become to serve the transparent sheet-like substrate 52a.

In addition, in the FIG. 3 embodiment, the belt-like photoreceptor 52 is wound on a pair of pulleys 56 and can be rotated by the pulleys 56 in a predetermined direction. Since the operation of FIG. 3 embodiment is similar to that of FIG. 1 embodiment as a whole, a duplicate description will be omitted here.

In any of the above described embodiments, since the thickness of the plate-like photoreceptor 14 or the belt-like photoreceptor 52 is very thin, it is possible to drastically miniaturize the apparatus in comparison with the apparatus using a drum-type photoreceptor. Therefore, as shown in FIG. 5, it is possible to fit the optical printer into a wall or into a piece of furniture.

More specifically, in FIG. 5 embodiment, the optical printer 10 is completely fit into a concave portion 60 formed on the wall or furniture piece 58, and a paper inlet (or outlet) and a paper outlet (or inlet) are exposed. In addition, in FIG. 1 or FIG. 3 embodiment, the optical printer 10 is constructed as a lateral type, but the optical printer 10 of FIG. 5 embodiment is constructed as a longitudinal type in FIG. 5 embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical printer, comprising:
a photoreceptor including a transparent substrate, a transparent electrode layer and a photosensitive layer formed on said substrate, said photoreceptor forming a generally planar surface;
means for moving said photoreceptor in a direction generally parallel to its planar surface;
arranged in opposition to said photoreceptor for supplying toner onto said photoreceptor, said opposite electrode having a single roller with an outer metallic sleeve to transfer the toner to said photoreceptor;
a single electric field applying means for applying an electric field between said transparent electrode layer of said photoreceptor and said opposite electrode;
mean for exposing said photoreceptor with a light image at a position opposite to said opposite electrode from a side of said transparent substrate;
toner absorption means for applying a force by which said toner can be absorbed toward said opposite electrode;
transcribing means for forming a toner image on said photoreceptor by selectively adhering said toner on said photoreceptor and for transcribing the toner image onto a paper; and
means for fixing the toner image being transcribed on said paper.

2. An optical printer in accordance with claim 1, wherein said photosensitive layer of said photoreceptor is of a material selected from the group consisting of amorphous silicon hydride, amorphous silicon halide, amorphous germanium, and amorphous alloys of such materials.

3. An optical printer in accordance with claim 2, wherein a film thickness of said photosensitive layer of said photoreceptor exists within a range of 100 Å through 100 μm.

4. An optical printer in accordance with claim 3, wherein said film thickness of said photosensitive layer of said photoreceptor exists within a range of 1000 Å through 100 μm.

5. An optical printer in accordance with claim 1, further comprising image reading means provided above said photoreceptor for reading an image of an original.

6. An optical printer in accordance with claim 1, wherein said photoreceptor is a plate-like photoreceptor which includes a plate-like substrate, a transparent electrode layer formed on said plate-like substrate and a photosensitive layer formed on said transparent electrode layer.

7. An optical printer in accordance with claim 1, wherein said photoreceptor is a belt-like photoreceptor which includes a flexible substrate, a transparent electrode layer formed on said flexible substrate and a photosensitive layer formed on said transparent electrode layer.

8. An optical printer, comprising:
a photoreceptor including a transparent substrate, a transparent electrode layer and a photosensitive layer formed on said substrate, said photoreceptor forming a generally planar surface, said photosensitive layer being of a material selected from the group consisting of amorphous silicon hydride, amorphous silica halide, amorphous germanium, and amorphous alloys of such materials;
means for moving said photoreceptor in a direction substantially parallel to its planar surface;
an opposite electrode arranged in opposition to said photoreceptor for supplying a toner onto said photoreceptor, said opposite electrode including a metallic outer roller surface;
a single electric field applying means for applying an electric field between said transparent electrode layer of said photoreceptor and said electrode;
means for exposing said photoreceptor with a light source at a position opposite to said opposite electrode from a side of said transparent substrate;
toner absorption means for applying a force by which said toner can be absorbed toward said opposite electrode;
transcribing means for forming a toner image on said photoreceptor by selectively adhering said toner on said photoreceptor and for transcribing the toner image onto a paper; and
fixing means for fixing the toner image being transcribed on said paper.

9. An optical printer as in claim 8 wherein said photoreceptor is in the form of a plate.

10. An optical printer as in claim 8 wherein said photoreceptor is in the form of a belt.

11. An optical printer comprising:

a photoreceptor including a transparent substrate, a transparent electrode layer and a photosensitive layer formed on said substrate, said photoreceptor forming a planar surface, which is moved in a direction parallel therewith;

toner supplying means including an opposite electrode which is arranged in opposition to said photoreceptor;

electric field applying means for applying an electric field between said transparent electrode layer of said photoreceptor and said opposite electrode;

exposing means for exposing from a side of said transparent substrate with a light image;

toner absorption means for applying a force to absorb said toner toward said opposite electrode;

transcribing means for forming a toner image on said photoreceptor by selectively adhering said toner on the said photoreceptor and for transcribing the toner image onto a paper;

fixing means for fixing the toner image being transcribed;

image reading means provided above said photoreceptor for reading an image of an original; and a first feeding path for feeding a paper on which said toner image formed on said photoreceptor is to be transcribed, and a second feeding path for feeding said original toward said image reading means.

12. An optical printer in accordance with claim 11, wherein said first feeding path and said second feeding path include a common feeding path.

13. An optical printer in accordance with claim 12, wherein said original includes said photoreceptor on which said toner image is formed.

14. An optical printer in accordance with claim 12, wherein said first feeding path feeds said paper in a first direction and said second feeding path feeds said original in a second direction opposite to said first direction.

15. An optical printer in accordance with claim 12, wherein said image reading means is arranged between said toner supplying means and said transcribing means.

16. An optical printer in accordance with claim 15, said image reading means includes a contact line sensor.

17. An optical printer, comprising:

a housing;

a photoreceptor housed in said housing and including a transparent substrate, a transparent electrode layer formed on said substrate and a photosensitive layer made of amorphous semiconductor, said photoreceptor forming a planar face which is moved in a first direction parallel therewith;

toner supplying means housed in said housing and including an opposite electrode which is arranged in opposite to said photoreceptor;

electric field applying means housed in said housing for applying an electric field between said transparent electrode layer of said photoreceptor and said opposite electrode;

exposing means housed in said housing for exposing from a side of said transparent substrate with a light image;

toner absorption means housed in said housing for applying absorption force to said toner to be absorbed toward said opposite electrode;

transcribing means housed in said housing for forming a toner image by selectively adhering said toner on said photoreceptor and for transcribing the toner image onto a paper;

a first opening portion formed on said housing;

a first feeding path housed in said housing for feeding a paper inserted from said first opening portion toward said transcribing means in said first direction;

image reading means housed in said housing arranged between said toner supplying means and said transcribing means so that said image reading means can read said toner image formed on said photoreceptor or an image on an original inserted from the outside;

a second opening portion formed on said housing;

a second feeding path formed in said housing for feeding said original inserted from said second opening portion toward said image reading means in a second direction opposite to said first direction, said second feeding path being formed by a commonly used portion of said first feeding path;

first roller means provided in the vicinity of said first opening portion for feeding said paper inserted from said first opening portion into said first feeding path or for discharging said original passing through said second feeding path;

fixing means housed in said housing for fixing a transcribed toner image onto said paper fed from said first feeding path; and roller means provided in the vicinity of said second opening portion for feeding said original inserted from said second opening portion into said second feeding path or for discharging said paper from said fixing means through said first feeding path.

* * * * *